United States Patent [19]

Kurihara et al.

[11] Patent Number: 4,557,949
[45] Date of Patent: Dec. 10, 1985

[54] METHOD OF MAKING A REVERSE OSMOSIS SEMIPERMEABLE MEMBRANE

[75] Inventors: Masaru Kurihara; Tetsuo Watanabe, both of Ohtsu; Tetsuo Inoue, Shiga, all of Japan

[73] Assignee: Toray Industries, Inc., Tokyo, Japan

[21] Appl. No.: 575,721

[22] Filed: Feb. 1, 1984

Related U.S. Application Data

[63] Continuation of Ser. No. 196,164, Oct. 14, 1980, abandoned, which is a continuation of Ser. No. 9,431, Feb. 5, 1979, abandoned.

[30] Foreign Application Priority Data

Feb. 13, 1978 [JP] Japan .................................. 53-14046

[51] Int. Cl.$^4$ .......................... B05D 5/00; B05D 3/02
[52] U.S. Cl. ................................ 427/244; 210/500.2; 427/245; 427/386; 427/389.9; 427/391; 427/393.5
[58] Field of Search ............................. 264/41, 45.1; 210/500.2; 427/244, 246, 386, 391, 393.5, 389.9, 245

[56] References Cited

U.S. PATENT DOCUMENTS

| | | | |
|---|---|---|---|
| 3,088,949 | 5/1963 | Little et al. | 544/221 |
| 3,346,534 | 10/1967 | Bills et al. | 528/254 |
| 3,378,530 | 4/1968 | Little | 528/258 |
| 3,446,359 | 5/1969 | Loeb et al. | 210/490 |
| 3,477,996 | 11/1969 | Formaini | 544/221 |
| 3,593,852 | 7/1971 | Meriwether | 210/321 R |
| 3,631,000 | 12/1971 | Argabright et al. | 260/77.5 NC |
| 3,660,327 | 5/1972 | Loncrini et al. | 260/22 TN |
| 3,744,642 | 7/1973 | Scala et al. | 210/500.2 |
| 3,766,181 | 10/1973 | Pregler | 260/248 NS |
| 3,892,665 | 7/1975 | Steigelmann et al. | 210/490 |
| 3,926,798 | 12/1975 | Cadotte | 210/23 |
| 4,148,734 | 4/1979 | Hilterhaus et al. | 264/48 |
| 4,366,062 | 12/1982 | Kurihara et al. | 210/651 |

OTHER PUBLICATIONS

Millipore Catalogue No. MC177/U, Dec. 1976, p. 46.
Chemischewerkehüls Data Sheet, *PU Raw Materials,* IPDI–T1890, 1978.

*Primary Examiner*—Evan K. Lawrence
*Attorney, Agent, or Firm*—Austin R. Miller

[57] ABSTRACT

A method of producing a semipermeable membrane comprising a polymeric material based upon a trisisocyanurate structure

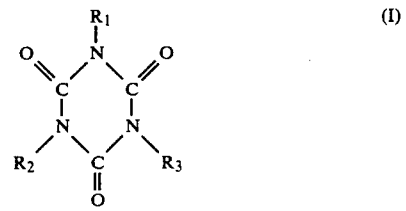

wherein, $R_1$, $R_2$ and $R_3$ are hydrogen or alkyl radicals containing from 2 to 5 carbon atoms, and at least two of $R_1$, $R_2$ and $R_3$ are alkyl radicals having hydroxyl or glycidyl groups. The membrane has high solute rejection, high flux, excellent high pressure resistance, and high temperature resistance and is a highly useful composite membrane for reverse osmosis. In the method, an aqueous solution containing, for example, a reaction product of Formula I is applied to the surface of a porous substrate and is heated at a temperature of about 100° C. to 190° C. to provide a cross-linked structure including a multiplicity of isocyanurate groups on the porous substrate.

24 Claims, No Drawings

METHOD OF MAKING A REVERSE OSMOSIS SEMIPERMEABLE MEMBRANE

This application is a continuation of application Ser. No. 196,164, filed 10/14/80, abandoned, which is a continuation of application Ser. No. 9,431, filed 2/5/79, abandoned.

BACKGROUND OF THE INVENTION

In recent years reverse osmosis has become attractive for utilization in the purification of sea water, saline water, for the recovery of valuable materials from waste liquids, etc. Various semipermeable membranes are now being used in commercial osmosis treatment of aqueous solutions either for water purification or for concentration of a liquid solution, or both. Such semipermeable membranes include the early "Loeb" type membranes made of cellulose acetate by processes as described in U.S. Pat. Nos. 3,133,132 and 3,133,137. The Loeb-type membranes are asymmetric types and are characterized by a very thin, dense surface layer or skin that is supported upon an integrally attached, much thicker supporting layer. However, the cellulose acetate Loeb-type membranes are restricted in use and in processability, largely because the membranes must be kept wet at all times, that is, their capability as reverse osmosis membranes is lost once the membranes are dried. These membranes have also exhibited deficiencies such as alkali or acidic degradation and biological degradation resulting in short life. Furthermore, these membranes are not used widely in a separation or recovery of valuable materials from a liquid mixture containing organic chemicals, because the membranes have low selectivity for valuable organic materials.

Other types of semipermeable membranes which are also in use include membranes fabricated from polyamides (please refer to U.S. Pat. No. 3,567,632, for example), polyimides, polysulfoneamides and other polymeric organic materials.

In later developments the processes have been utilized for preparing an ultra-thin film or skin separately from a porous supporting layer. Membranes so prepared have become known as composite membranes. In preparing such membranes it is possible to tailor both the ultra-thin film and the porous supporting layer in such a manner that each component possesses the most desirable properties. A process for preparation of composite membranes is described in U.S. Pat. Nos. 3,744,642, 3,926,798, and in P. B. Reports Nos. 234,198 and 248,670. These prior art membranes have, however, been generally subject to deficiencies such as compaction, resulting in short life, as well as undesirably low flux or solute rejection, all resulting in inefficient operation.

SUMMARY OF THE INVENTION

It is an object of this invention to provide a process for preparing a semipermeable composite membrane for liquid separation which provides good solute rejection and is capable of high flux rates, as well. Another object of this invention is to provide a process for preparing a semipemerable composite membrane which is not only capable of water purification but useful for the recovery of valuable materials from the water as well. Other objects and advantages of this invention will appear in further detail hereinafter.

DETAILED DESCRIPTION OF THE INVENTION

In accordance with this invention, a process for the preparation of a semi-permeable membrane for liquid purification is provided comprising preparing a crosslinked polymeric material having an isocyanurate structure obtained by reacting at least one compound represented by the Formula (I) and/or water soluble reaction products thereof:

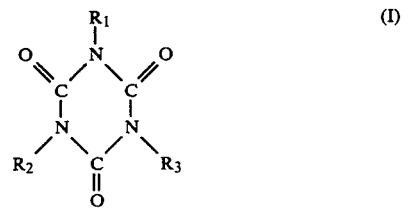

wherein $R_1$, $R_2$ and $R_3$ are hydrogen or alkyl radicals containing from 2 to 5 carbon atoms, and at least two of $R_1$, $R_2$ and $R_3$ are alkyl radicals having a hydroxy group or a glycidyl group attached thereto.

Examples of the compounds represented by the Formula (I) include 1,3,5-tris(hydroxyethyl)isocyanuric acid (referred to hereinafter as THEIC), bis(2-hydroxypropyl)isocyanuric acid and 1,3,5-tris(glycidyl)isocyanuric acid, for example. THEIC is particularly useful in accordance with this invention.

Examples of water soluble reaction products derived from the compounds represented by the Formula (I) include intermolecular condensation products or addition reaction products which are soluble in water, respectively. More specifically, examples of such intermolecular reaction products can be obtained by heating THEIC with a little water and an acid catalyst such as sulfuric acid at 140° C. for 10 minutes to yield a pasty product, and then removing the water generated in the reaction system under reduced pressure. The compounds represented by the Formula (I) and the water soluble reaction products obtained may also form copolymers by reacting them with various comonomers.

Examples of comonomers used in this invention include furfuryl alcohol, tetrahydrofurfuryl alcohol, multivalent alcohols containing from 2 to 8 carbon atoms such as ethylene glycol, glycerin, sorbitol or inositol, epoxy compounds containing from 2 to 5 carbon atoms such as ethylene oxide, propylene oxide, polyethylene oxide, multivalent carboxylic acids containing from 2 to 17 carbon atoms such as oxalic acid, maleic acid, succinic acid, fumaric acid, 1,2,3,4-butane tetracarboxylic acid and 1,2,3,4-benzene tetracarboxylic acid, multivalent hydroxy acids containing from 2 to 17 carbon atoms such as glycolic acid, lactic acid, malic acid, tartaric acid, citric acid, salicylic acid and formaldehyde. Although the crosslinked polymeric materials obtained from the compounds represented by the Formula (I) and/or their water soluble reaction products provide a semipermeable membrane having excellent resistance to the action of chlorine, it is important also to obtain a membrane having good solute rejection or flux. It is, therefore, preferable to react the compounds represented by the Formula (I) and/or their water soluble reaction products with at least one comonomer selected from the group consisting of the above mentioned compounds, particularly furfuryl alcohol, epoxy compounds or ethylene glycol. The polymeric material is preferably a reaction product obtained by reacting at least 15% by weight of a compound represented by the Formula (I) and/or a water soluble reaction product thereof with up to about 85% by weight of comonomer.

The copolymerization ratio of the compounds represented by the Formula (I) and/or their water soluble reaction products is preferably within the range of at least about 20% by weight, preferably from 20 to 80% by weight of the total including comonomer. In determining this ratio, when a water soluble reaction product is used, the amount used is a value converted into the chemically equivalent amount of the compound represented by the Formula (I).

According to this invention, the crosslinked polymeric material having a isocyanurate structure is prepared by heating an aqueous solution or a water soluble organic solvent solution (referred to hereinafter as the coating solution for reasons which will appear in further detail hereinafter) containing at least one compound represented by the Formula (I) and/or a water soluble reaction product thereof, a comonomer selected from the group consisting of the above mentioned compounds and a solvent at a temperature of about 100° to 170° C. in the presence of an acid catalyst. It is important that an acid catalyst can be employed to produce the polymeric material of this invention. Suitable examples of such acid catalysts include sulfuric acid, phosphoric acid, hydrogen chloride, methane sulfonic acid, benzene sulfonic acid and toluene sulfonic acid.

The semipermeable membrane of this invention is very difficult to prepare from a polymeric material having a tris isocyanurate structure, because the polymeric material is substantially insoluble in solvents such as water and organic solvents, particularly when a high molecular weight or crosslinked polymer is used. The semipermeable membrane of this invention is, therefore, prepared by coating or dipping the coating solution on various substrates, followed by heating (and curing) the coated substrates in an oven at a temperature of about 100° C. to 190° C. for a period of about 1 to 30 minutes to polymerize the monomers used. It is possible to use a water soluble reaction product as the coating solution of this invention, which product is produced by heating a compound represented by the Formula (I). For example, THEIC may be heated in a formaldehyde aqueous solution at about 100° C. for 30 minutes.

In addition to the compounds represented by the Formula (I) and/or their water soluble reaction products, comonomers and acid catalyst, the coating solution may, optionally, contain other additives. For example, other solvents such as methyl alcohol, ethyl aclohol, propyl alcohol or isopropyl alcohol may be used to improve the pot life of the coating solution. Anion surfactants such as dodecyl sodium sulfate, sodium dodecylbenzene sulfonate, "Demol"-N(KAO Soap Co. Ltd., Japan), and nonion surfactants such as polyethylene glycol, polyethylene glycol monoalkylether, polyethylene glycol monostearate, or "Tween" (Atlas Powder Co.) may also be added to the coating solution to improve surface wettability of the substrate.

Optimum concentrations of the coating solution may vary considerably depending on the nature of the specific catalyst and of the substrate, and of the feed solution, as well. Generally, however, the optimum concentration of the compound represented by the Formula (I) and/or its water soluble reaction products (computed as heretofore mentioned) is about 0.5 to 10% by weight, preferably about 1 to 2% by weight. The ratio of acid catalyst to the compounds represented by the Formula (I) and/or their water reaction products is also not critical, but ratios in a range of about one part by weight of catalyst per 20 parts by weight of the compound and/or water soluble reaction product have been employed and have been found to give good results. The water soluble reaction products may be employed in amounts of about 1 to 8% by weight, preferably about 2 to 6% by weight, and the acid catalyst may be added in an amount of about 0.5 to 1 part by weight to one part by weight of the water soluble reaction product.

The substrates used in this invention may be any of the type conventionally used in reverse osmosis processes. The preferred substrates, however, are those prepared from organic polymers such as polysulfone, chlorinated polyvinyl chloride or polycarbonate, for example. Alternatively, glass or metal plates or metal drums may be used as substrates for preparing the semipermeable membrane of this invention. The preferred substrate is a polysulfone substrate.

Various substrate shapes may be used other than microporous films. Shapes such as hollow fibers or tubular pipes are useful. Preparation of microporous substrates is described in the Office of Saline Water Research and Development Progress Report No. 359 (1968).

Microporous polysulfone substrates (flat film or hollow fiber) may be prepared by forming into a flat film or a hollow fiber a polysulfone solution composed of a water soluble solvent such as dimethylformamide (DMF). This is followed by immersion in a coagulation bath substantially composed of water to gel the film or fiber. The polysulfone substrate thus obtained possesses very small surface pores ranging between about 10 and 1,000 Angstroms (Å) in diameter, which grow integrally wider from the front surface toward the back surface. The front surface porosity is about 10 to 20% and it may become gradually larger from an inner portion to the back surface. Polysulfone substrates, to be useful in this invention, should have a favorable pore structure in addition to durability in compaction and resistance to the action of various chemical reagents. The smaller the pore size on the surface of the substrate becomes, the greater becomes the supporting effect. Therefore, when the membrane is pressurized, this yields a higher solute rejection. Conversely, a larger surface porosity of the substrate yields a higher flux due to reduced water flow resistance through the membrane.

The addition of a surfactant to the coagulating bath in some cases causes the substrate to have more favorable performance characteristics.

To achieve good performance characteristics, it is preferred that the microporous substrate be about 30 to 100 microns in thickness, more preferably about 100 to 300 microns in thickness and that the semipermeable membrane be about 50 to 1000 Angstroms in thickness, more preferably 100 to 500 Angstroms in thickness.

When the semipermeable membrane is used in practice, it is necessary to avoid the deformation or destruction of the membrane and to have considerable production capacity. This is accomplished by enlargement of the membrane packing density used in a constant volume. Many different arrangements useful for this purpose have already been provided herein. For example, the membrane may be attached inside or outside a porous tube (tubular form type) or the membrane may be supported on a porous plate and accumulated (plate and frame) type. The membrane may be piled on a film of taffeta or a non-woven fabric, uncalendered fabric and calendered fabric or paper or a porous film, or directly cast upon any of them, and it may be spirally wound (spiral woundtype) or the membrane itself may be made as a hollow fiber. The semipermeable membrane of this invention may also be used in any one of these formulations.

In the case of the tubular formulation, the polysulfone microporous substrate is cast directly on a porous tube and is then composed as a composite membrane. In the case of a hollow fiber, the polysulfone substrate is formed as a hollow fiber and is then formed as a composite membrane. And in the case of the spiral module, the polysulfone substrate is at first formed on a reinforcing fabric, for example, and is then composed as a composite membrane.

Coating methods which are of themselves commonly known are applicable to the process of covering the substrate with the coating solution. For example, the method may include coating a solution on the substrate, dipping the substrate in a solution, or spraying the solution on the substrate. Generally, the usual method involves dipping the substrate in the solution for a period of a few seconds to a few hours, to adhere and to absorb the desired amount of coating solution. The coating solution may be drained if an excessive amount has been adhered or absorbed. Drainage may not be needed when the amount is adequate.

The coated substrate thus obtained is placed in a convection oven and heated to about 100° to 190° C.; the components of the coating solution begin to polymerize and also to crosslink with the polymer main structure. The reaction period varies with the components and the temperature, but is normally about 1 to 30 minutes, preferably about 5 to 15 minutes. The crosslinked composite membrane thus obtained may be used as it is, but generally post-treatment is applied such as washing of acid catalyst and neutralization of the produced acid groups by use of an alkaline solution. The alkaline solution may be a monovalent organic or inorganic base but more preferably, considering the ion crosslinking, a solution containing multivalent cations is used. Preferable cations are, for example, copper (cuprous or cupric), magnesium, calcium, aluminum and iron (ferrous or ferric).

Another useful post-treatment involves treating with an organic compound which reacts readily with the active sites such as the unreacted hydroxyl groups or epoxide groups at the surface of the composite membrane. This post-treatment provides good stretch resistance at the membrane surface.

Membranes so obtained show exceedingly high salt rejection and very high flux. They may be used in the wide pH range, as distinguished from cellulose acetate membranes, and show excellent durability upon exposure to high temperatures. Their durability under high pressure is also excellent. This is especially noticeable when THEIC is copolymerized. This is highly desirable because decline of flux rate is avoided even in the case of high pressure operation.

In addition, by choosing selectively the components of the coating solution, a membrane can be obtained which has excellent resistance to chlorine contained in the feed solution.

Also, the membrane of this invention has excellent durability and exhibits exceedingly high rejection of organic chemicals such as ε-caprolactum, for example. Accordingly, it is highly useful for concentration or reclamation processes in which useful materials are separated from solution.

This invention is further illustrated by reference to specific examples, but is not intended to be limited by them, since the scope of the invention is defined by the appended claims.

In the Examples which follow, solute rejection (%) and flux ($m^3/m^2$ day) are calculated as follows:

$$\text{solute rejection } (\%) = [(C_1-C_3)/C_1] \times 100$$

wherein
$C_1$ is the solute concentration in the feed and
$C_3$ is the solute concentration in the permeate $$\text{flux } (m^3/m^2 \text{ day}) = Q/S$$

wherein
Q = quantity of solvent passing through the membrane per day ($m^3$/day), and
S = active membrane surface ($m^2$).

EXAMPLE 1

In the preparation of a film from an isocyanurate derivative, 5 grams of THEIC, 94 grams of water and 0.3 grams of 95% sulfuric acid were mixed in a flask and dissolved. A glass plate was covered with this solution and heated 15 minutes at 150° C. in a convection oven (Safety Oven SHPS-220, TABAI MFG. CO. LTD.)

The film thus obtained was not soluble in water or N-methylpyrrolidone. The infrared spectrum (HITACHI-EPI-S2) of the film showed 1,695 $cm^{-1}$, 1,460 $cm^{-1}$ and 765 $cm^{-1}$ due to the isocyanurate ring, 1,115 $cm^{-1}$ due to the newly formed ether bond (C—O—C). The bond at 3,500 $cm^{-1}$ due to the hydroxyl group, which is characteristic of the monomer, was generally reduced.

EXAMPLE 2

A polyester woven fabric (taffeta) having a warp density of 90/inch and a woof density of 67/inch, and having a thickness of 160 μm, woven by using 150 denier multifilaments 20 cm by 30 cm, was set on a glass plate. A dimethylformamide (DMF) solution containing 15% polysulfone (Union Carbide Co. Ltd. Udel P-3500) was cast upon the glass plate at about 200 μm thickness, at room temperature (15° to 30° C.). Immediately the product was immersed into water containing 0.5% by weight of sodium dodecyl sulfate at room temperature for 5 minutes. The product was then washed for one hour, using pure water.

The resulting fiber reinforced polysulfone substrate (FR-PS) had 200 μm thickness and had a pure water permeability of 0.1 to 0.2 $g/cm^2$ sec. atm. under conditions of 1 $Kg/cm^2$ driving pressure and a feed temperature of 25° C.

From analysis by electron microscope photographs, the FR-PS possessed 600 pores per square micrometer ($\mu m^2$), and each of the pores was between 100 to 500 Angstroms in diameter.

The wet FR-PS was immersed 10 minutes at room temperature in a water solution containing 2% by weight of THEIC, 0.7% by weight of sodium dodecylsulfate and 0.1% by weight of sulfuric acid. Then the FR-PS was carried out and held one minute with the short dimension of the FR-PS in a vertical position to drain excess coating solution, after which it was clamped between 2 cm iron strips (150 grams each piece) and was suspended in a convection oven with the long dimension in a horizontal position for 20 minutes at 150° C.

The reverse osmosis performance of this membrane was 0.02 m$^3$/m$^2$ day flux and 96.7% rejection under the following conditions (referred to hereinafter as standard conditions):
   driving pressure: 40 kg/cm$^2$
   feed solution: 0.25 wt % NaCl aqueous solution
   feed temperature: 25° C.
   Sampling: after 24 hours run.

EXAMPLE 3

88 grams of THEIC and 10 grams of water were mixed and stirred for 10 minutes at 130° C., after which the temperature was raised to 140° C. and 2 grams of sulfuric acid were added. Ten minutes later stirring was stopped, and the water was evaporated off in a vacuum. A condensed oligomer of THEIC was obtained.

The membrane fabrication method was the same as Example 2, except for the use of a coating solution which contained 2 wt % of the foregoing condensed oligomer of THEIC, 0.7 wt % of dodecyl sodium sulfate and 0.1 wt % of sulfuric acid.

The performance of this membrane was 0.1 m$^3$/m$^2$ day and 97.5% rejection under standard conditions.

EXAMPLES 4 TO 15

The performances of membranes under standard conditions, obtained from several monomers using the same fabrication methods as in Example 2, are listed in Table 1.

rejection, and after 100 hours test this performance was maintained.

The test conditions were as follows:
   Feed solution: 0.25% NaCl plus 150 ppm Cl$_2$ aqueous solution
   Feed temperature: 25° C.
   Driving pressure: 40 kg/m$^2$

EXAMPLE 17

A water solution containing 4 wt % of THEIC, 2 wt % of furfuryl alcohol (FA) (mole ratio: THEIC/FA=43/57), 2 wt % of ethylene glycol, 4 wt % of sulfuric acid and 20 wt % of isopropyl alcohol was prepared and matured 15 minutes at room temperature. The membrane fabrication was the same as in Example 2 except for using this coating solution. The resulting membrane performance was 0.35 m$^3$/m$^2$ day flux and 99.7% salt rejection under standard conditions.

EXAMPLE 18

The membrane fabrication was the same as Example 17 except that polyethylene glycol (M.W.=20,000) was used instead of ethylene glycol. The membrane performance was 0.45 m$^3$/m$^2$ day flux and 99.6% salt rejection under standard conditions.

EXAMPLE 19

A water solution containing 1 wt % of THEIC, 2 wt % of FA (mole ratio: THEIC/FA=16/84), 2 wt % of sulfuric acid, 1 wt % of polyethylene glycol and 20 wt % of isopropyl alcohol was prepared and matured at room temperature for 15 minutes. The membrane fabrication was the same as Example 17 except that the curing temperature was 160° C. The membrane perfor-

TABLE 1

| Example | THEIC (wt %) | Comonomer (wt %) | THEIC/Comonomer (mole ratio) | Curing (°C./minutes) | Rejection (%) | Flux (m$^3$/m$^2$ day) | H$_2$SO$_4$ (%) |
|---|---|---|---|---|---|---|---|
| 4 | 1 | — | — | 150/20 | 78 | 0.71 | 0.1 |
| 5 | 2 | 1 (EG) | 33/67 | 150/20 | 96.3 | 0.05 | 0.1 |
| 6 | 2 | 1 (PEG 400) | 73/27 | 150/20 | 95.0 | 0.03 | 0.1 |
| 7 | 2 | 1 (Sorbitol) | 62/38 | 150/20 | 97.0 | 0.04 | 0.1 |
| 8 | 2 | 4 (DEG) | 17/83 | 150/20 | 64.0 | 0.003 | 0.1 |
| 9 | 2 | 4 (glycerol) | 16/84 | 150/20 | 77.0 | 0.002 | 0.1 |
| 10 | 4 | 2 (inositol) | 58/42 | 175/15 | 96.0 | 0.02 | 4 |
| 11 | 4 | 2 (BTCA) | 65/35 | 175/15 | 80 | 0.001 | 4 |
| 12 | 4 | 2 (BTS) | 62/38 | 175/15 | 85 | 0.001 | 4 |
| 13 | 4 | 2 (TGIC) | 68/32 | 175/15 | 89 | 0.01 | 4 |
| 14 | — | 1 (TGIC) | — | 150/20 | 88 | 0.01 | 2 |
| 15 | — | 5 (TGIC/EG = 1/1) | — | 150/20 | 56 | 0.5 | 0.3 |

EG: ethylene glycol
PEG 400: polyethylene glycol (molecular weight 400)
DEG: diethylene glycol
BTCA: 1,2,3,4-benzene tetracarboxylic acid
BTS: 1,2,3,4-butane tetracarboxylic acid
TGIC: tris-(glycidyl) isocyaporate

EXAMPLE 16

The membrane performance of Example 3 under the following conditions was 0.15 m$^3$/m$^2$ day flux and 97% mance was 0.55 m$^3$/m$^2$ day flux and 99.2% salt rejection under standard conditions.

EXAMPLE 20

A coating solution containing 15 wt % of polysulfone was cast directly on a glass plate of about 150 thickness at room temperature, and was immediately immersed in a water bath containing 20 wt % of DMF and 0.5 wt % of dodecylsodium sulfate at room temperature. After 5 minutes, a polysulfone substrate film (P.S.F.) floated off the glass plate. It was washed for an hour with pure water. A water solution containing 1 wt % of THEIC, 2 wt % of FA, 2 wt % of sulfuric acid, 1 wt % of polyethylene glycol (M.W.=20,000) and 20 wt % of isopropyl alcohol was prepared and matured 15 minutes at room temperature. A wet P.S.F. of 20 cm by 30 cm was dipped 5 minutes in this solution after which the P.S.F. was carried out and held one minute with the short dimension of the P.S.F. in a vertical position to drain excess coating solution. Then it was clamped between 2 cm iron strips (75 grams per strip) and was suspended in a convection oven with the long dimension in a horizontal position for 15 minutes at 150° C. Then it was soaked in a water solution containing 0.1 wt % of barium hydroxide for 15 minutes at room temperature. The membrane performance was 0.8 $m^3/m^2$ day flux and 97.0% salt rejection under standard conditions.

EXAMPLE 21

Membrane performance toward ε-caprolactum was measured by using the membrane of Example 17 under the following conditions:

Feed solution: water containing 5% ε-caprolactam
Feed temperature: 50° C.
Driving pressure: 40 kg/cm$^2$ The flux was 0.4 $m^3/m^2$ day and the ε-caprolactam rejection was 98%.

EXAMPLE 22

Membrane performance toward DMF was measured by using the membrane of Example 18 under the following conditions:

Feed solution: water containing 10% DMF
Feed temperature: 50° C.
Driving pressure: 50 kg/cm$^2$ The flux was 0.2 $m^3/m^2$ day and the DMF rejection was 95%.

EXAMPLE 23

Membrane performance toward dimethyl sulfoxide was measured by using the membrane of Example 17 under the following conditions:

Feed solution: water solution containing 10% dimethyl sulfoxide
Feed temperature: 50° C.
Driving pressure: 50 kg/cm$^2$ The flux was 0.15 $m^3/m^2$ day and the dimethyl sulfoxide rejection was 96%.

COMPARATIVE EXAMPLE 1

Membrane performances toward the organic substances which were used in Examples 21 to 23 were measured for a cellulose acetate membrane, an aromatic polyamide membrane and an N.S. (North Star)-200 (polyfurfuryl alcohol) membrane respectively. The results are shown in Table 2.

TABLE 2

| MEMBRANES | SOLUTES | | |
| --- | --- | --- | --- |
| | ε-CAPROLACTUM | DMF | DMSO |
| Cellulose acetate | 1.00–50 | 0.80–32 | 0.10–55 |
| Aromatic polyamide | 0.35–88 | 0.60–50 | 0.20–89 |
| N.S.-200 | 0.45–96 | 0.25–50 | 0.10–75 |

In each case, the flux ($m^3/m^2$ day) appears before the hyphen in Table 2 and the solute rejection (%) appears following the hyphen. Solute rejections were measured by use of a total Carbon Analyser (C-2 type TCD-TC Automatic Analyser made by Toray, Inc. of Japan).

EXAMPLE 24

The effect of curing conditions upon membrane performance is shown in Table 3. The membrane fabrication method was the same as Example 18 except that the curing condition varied as indicated in the Table.

TABLE 3

| Curing condition temp. (°C.)/period (minutes) | Flux ($m^3/m^2$ day) | Salt rejection (%) |
| --- | --- | --- |
| 130/15 | 0.33 | 94.9 |
| 150/15 | 0.50 | 99.3 |
| 170/15 | 0.40 | 99.6 |
| 190/15 | 0.02 | 99.7 |

EXAMPLE 25

A water solution containing 4 wt % of THEIC, 2 wt % of furfuryl alcohol (mole ratio: THEIC/FA=43/57), 4 wt % of sulfuric acid, 1 wt % of dodecyl sodium sulfate and 20 wt % of isopropyl alcohol was prepared and matured for 15 minutes at room temperature.

The membrane was fabricated from FR-PS and the method of Example 17 was used. The flux was 1.00 $m^3/m^2$ day and the salt rejection was 99.2% under standard conditions.

EXAMPLE 26

The effect of feed pH on membrane performance was measured by use of the membrane of Example 18. At pH 7 the flux was 0.45 $m^3/m^2$ day and salt rejection was 99.6% under standard conditions. When the pH was raised to 11 by adding 0.18 wt % of sodium carbonate and 0.02 wt % of sodium bicarbonate, the flux was 0.68 $m^3/m^2$ day and the salt rejection was 99.1%. When the pH was reduced to 3 by adding 0.14 wt % of sodium acetate and 0.06 wt % of hydrogen chloride the flux was 0.48 $m^3/m^2$ day and the salt rejection was 95.3%.

When the pH was returned from 3 or 11 to 7, the membrane performance also returned to the value of the pH 7 tests. The salt rejection was maintained above 95% and was a practically useful value throughout the range between pH 3 and pH 11.

EXAMPLE 27

The membrane performance of the membrane of Example 25 was 0.45 $m^3/m^2$ day flux and 99.8% salt rejection under the following conditions (referred to hereinafter as sea water conditions).

Feed solution: Synthetic sea water (osmotic pressure: 25.5 kg/cm$^2$)
Feed temperature: 25° C.
Operating pressure: 70 kg/cm$^2$
Feed flow rate: 1 m/sec.

EXAMPLE 28

A membrane was fabricated as in Example 17 except that a water solution containing 1 wt % of THEIC, 2 wt % of furfuryl alcohol (mole ratio: THEIC/FA=16/24), 2 wt % of sulfuric acid and 1 wt % of dodecyl sodium sulfate was used and cured 15 minutes at 150° C. The membrane performance was 0.5 m³/m² day flux and 99.9% salt rejection under standard conditions.

From the results of electron microphotographic studies, this membrane was found to possess a thin active layer between about 100 and 300 Angstroms in thickness on the surface of the polysulfone substrate.

The above membrane was evaluated under sea water conditions by changing the pressure and the feed temperature. The results appear in Table 4.

TABLE 4

| Operating pressure (kg/cm²) | Feed temp. (°C.) | Rejection (%) | Flux (m³/m² day) |
|---|---|---|---|
| 42 | 25 | 99.8 | 0.14 |
| 56 | 25 | 99.9 | 0.31 |
| 70 | 25 | 99.9 | 0.50 |
| 70 | 35 | 99.9 | 0.61 |
| 70 | 45 | 99.8 | 0.95 |
| 70 | 25 | 99.8 | 0.55 |

Each run was operated one day and the feed rate was 1.85 m/sec.

EXAMPLE 29

26.1 grams (0.1 mole) of THEIC and 12.2 grams (1.5 mole) of a water solution containing 37 wt % of formalin was mixed and heated at 100° C. with complete dissolution. Thus, a formalin modified THEIC was obtained. A water solution containing 4 wt % of this formalin modified THEIC, 0.2 wt % of sulfuric acid, 0.7 wt % of dodecyl sodium sulfate and 20 wt % of isopropyl alcohol was prepared. The membrane was fabricated in the same way as in Example 2, except that the above solution was used. The flux was 0.1 m³/m² day and the salt rejection was 96.0% under standard conditions.

EXAMPLE 30

The membrane was fabricated in the same way as Example 17 except that the curing temperature was 150° C. and a water solution of the following components was used:

THEIC: 1 wt %
Inositol: 1 wt %
FA: 2 wt %
Sulfuric acid: 2 wt %
dodecyl sodium sulfate: 0.7 wt %
isopropyl alcohol: 20 wt %

The membrane performance was 0.41 m³/m² day flux and 99.2% salt rejection under sea water conditions.

EXAMPLE 31

The FR-PS was fabricated as in Example 2 except for using a coating solution containing 14 wt % of polysulfone.

The membrane was fabricated in Example 2 except that a coating solution containing 1 wt % of THEIC, 2 wt % of FA, 2 wt % of sulfuric acid and 0.7 wt % of dodecyl sodium sulfate was used and cured at 145° C. for 15 minutes, after which the membrane was treated 15 minutes in 1N-sodium hydroxide at 95° C. The performance of the membrane obtained appears in Table 5. The feed solution was synthetic brackish water. The performance of a cellulose acetate membrane under the conditions of Experiment (b) was 0.65 m³/m² day flux and 93% salt rejection.

TABLE 5

| Exp. No. | Measuring condition*¹ feed solution | operating pressure (kg/cm²) | Performance Flux (m³/m² day) | Performance Rej. (%) | Membrane coefficient*² A × 10⁵ (g/cm. sec. atm.) | Membrane coefficient*² B × 10⁵ (cm/sec.) | A³/B × 10¹⁰ |
|---|---|---|---|---|---|---|---|
| a | NaCl 0.25% | 10 | 1.00 | 96.2 | 15.0 | 4.57 | 739 |
| b | | 20 | 2.20 | 97.6 | 14.6 | 6.26 | 497 |
| c | | 30 | 3.49 | 98.0 | 14.9 | 8.24 | 401 |
| d | | 40 | 4.90 | 97.2 | 15.4 | 16.3 | 224 |
| e | MgCl₂.6H₂O 0.58% | 10 | 0.71 | 93.5 | 10.5 | 5.62 | 206 |
| f | | 20 | 1.53 | 96.0 | 10.2 | 7.39 | 144 |

*¹at 25° C.
*²These coefficients A and B are calculated according to the reference; H. K. Landol, Desalination 13 (1973) pp. 312–332.

We claim:

1. A process of preparation of a semipermeable composite membrane comprising:
   (a) applying to the surface of a porous substrate an aqueous solution containing (A) at least one component selected from the group consisting of (i) a component defined by the Formula (I) or reaction products formed between a plurality of components of the formula:

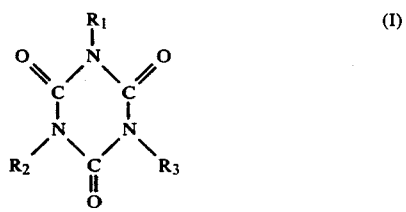

(I)

wherein each of $R_1$, $R_2$, and $R_3$ is selected from the group consisting of hydrogen, an alkyl radical containing from 2 to 5 carbon atoms, and an alkyl radical carrying a functional hydroxyl group or a functional glycidyl group, with the proviso that at least two of $R_1$, $R_2$, and $R_3$ comprise alkyl radicals carrying a functional hydroxyl group or a functional glycidyl group, (ii) reaction products between a compound defined as group (i) and at least one water soluble comonomer selected from the group consisting of furfuryl alcohol, tetrahydrofurfuryl alcohol, an epoxy compound containing from 2 to 5 carbon atoms, a multivalent alcohol containing from 2 to 8 carbon atoms, polyethylene oxide, a multivalent carboxylic acid containing from 2 to 17 carbon atoms, multivalent hydroxy acid containing from 2 to 17 carbon atoms and formaldehyde, and (iii) a mixture of reaction products between the compounds defined as group (i) and at least one water soluble comonomer selected from the group consisting of furfuryl alcohol, tetrahydrofurfuryl alcohol, an epoxy compound containing from 2 to 5 carbon atoms, a multivalent alcohol containing from 2 to 8 carbon atoms, polyethylene oxide, a multivalent carboxylic acid containing from 2 to 17 carbon atoms, a multivalent hydroxy acid containing from 2 to 17 carbon atoms and formaldehyde, and (B) an acid catalyst, and (b) heating the solution to polymerize the compound represented by the Formula (I) and/or said comonomer at a temperature of from about 100° C. to 190° C. for a period of about one minute to about 30 minutes.

2. A process according to claim 1, wherein the aqueous solution contains at least one additive selected from the group consisting of lower alcohols containing from 1 to 5 carbon atoms, and a surfactant.

3. A process according to claim 2, wherein the surfactant is selected from the group consisting of dodecyl sodium sulfate, sodium dodecylbenzene sulfonate, polyethylene glycol, polyethylene glycol monoalkylether and polyethylene glycol monostearate.

4. A process according to claim 2, wherein the lower alcohol is selected from the group consisting of methyl alcohol, ethyl alcohol, propyl alcohol and isopropyl alcohol.

5. A process according to claim 4, wherein the acid catalyst is sulfuric acid.

6. A process according to claim 21, wherein the acid catalyst is an acid selected from the group consisting of sulfuric acid, phosphoric acid, hydrogen chloride methane sulfonic acid, benzene sulfonic acid and toluene sulfonic acid.

7. A process according to claim 1, wherein the porous substrate is a polysulfone substrate.

8. A process according to claim 1, wherein said compound represented by the Formula I is selected from the group consisting of 1,3,5-tris(hydroxyethyl)isocyanuric acid, bis(2-hydroxypropyl)isocyanuric acid and 1,3,5-tris(glycidyl)isocyanuric acid, and mixtures thereof.

9. A process according to claim 1, wherein said aqueous solution is an aqueous solution containing a water soluble intermolecular condensation product and/or addition reaction product of said compound represented by the Formula (I).

10. A process according to claim 9, wherein said water soluble condensation product and/or addition reaction product is selected from the group consisting of an intermolecular condensation product of 1,3,5-tris(-hydroxyethyl)isocyanuric acid, an intermolecular condensation product of 1,3,5-tris(hydroxylethyl)isocyanuric acid with formaldehyde, and an addition reaction product of 1,3,5-tris(glycidyl)isocyanuric acid with ethylene glycol.

11. A process according to claim 1, wherein said aqueous solution is an aqueous solution containing the compound represented by the Formula (I), furfuryl alcohol and/or a multivalent alcohol containing from 2 to 8 carbon atoms.

12. A process according to claim 1, wherein said epoxy compound is selected from the group consisting of ethylene oxide, propylene oxide and a mixture thereof, said multivalent alcohol is selected from the group consisting of ethylene glycol, glycerin, inositol, sorbitol and mixtures thereof, said multivalent carboxylic acid is selected from the group consisting of oxalic acid, maleic acid, succinic acid, fumaric acid, 1,2,3,4-butane tetracarboxylic acid, 1,2,3,4-benzene tetracarboxylic acid and mixtures thereof, and said multivalent hydroxy acid is selected from the group consisting of glycolic acid, malic acid, citric acid, tartaric acid, salicylic acid and mixtures thereof.

13. A process according to claim 1, wherein said aqueous solution is an aqueous solution containing 1,3,5-tris(hydroxyethyl)isocyanuric acid and furfuryl alcohol.

14. A process according to claim 1, wherein the water soluble comonomer is in a range of up to 85% by weight of the compound represented by the Formula (I).

15. A process according to claim 14, wherein the compound represented by the Formula (I) is in about a range of 20% to 80% by weight.

16. A process according to claim 1, wherein the porous substrate is about 100 to 300 microns in thickness and the semipermeable membrane is about 100 to 500 Angstroms in thickness.

17. A process according to claim 1, wherein said porous substrate is reinforced or piled on by a material selected from the group consisting of an uncalendered fabric, a calendered fabric, nonwoven fabric, porous film and paper.

18. A process for preparation of a semipermeable composite membrane comprising:
(a) applying to the surface of a porous substrate an aqueous solution containing 1,3,5-tris(hydroxyethyl)isocyanuric acid, furfuryl alcohol, and an acid catalyst, and
(b) heating to polymerize said 1,3,5-tris(hydroxyethyl)isocyanuric acid and furfuryl alcohol at a temperature of from about 100° C. to 190° C. for a period of about one minute to 30 minutes.

19. A process according to claim 18, where said aqueous solution contains a surfactant.

20. A process according to claim 19, wherein said surfactant is selected from the group consisting of dodecyl sodium sulfate, sodium dodecyl benzene sulfonate, polyethylene glycol, polyethylene monoalkylether, and polyethylene glycol monostearate.

21. A process according to claim 18, wherein said acid catalyst is an acid selected from the group consisting of sulfuric acid, phosphoric acid, hydrogen chloride, methane sulfonic acid, benzene sulfonic acid and toluene sulfonic acid.

22. A process according to claim 21, wherein said acid catalyst is sulfuric acid.

23. A process according to claim 18, wherein said substrate is polysulfone substrate.

24. In a process for preparing a semipermeable membrane, the steps which comprise:
(a) coating the surface of a porous substrate with a solution containing a multiplicity of isocyanurate groups of the formula:

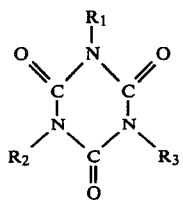

wherein each of $R_1$, $R_2$, and $R_3$ is selected from the group consisting of hydrogen, an alkyl radical containing from 2 to 5 carbon atoms, and an alkyl radical carrying a functional hydroxyl group or a functional glycidyl group, with the proviso that at least two of $R_1$, $R_2$, and $R_3$ comprise alkyl radicals carrying a functional hydroxyl group or a functional glycidyl group, and (b) polymerizing said groups by heating and curing at about 100° C. to 190° C. for a time to provide a crosslinked structure including a multiplicity of said isocyanurate groups on the porous substrate.

* * * * *